US012341658B2

(12) United States Patent
Brown et al.

(10) Patent No.: US 12,341,658 B2
(45) Date of Patent: Jun. 24, 2025

(54) GLOBAL INTENT-BASED CONFIGURATION TO LOCAL INTENT TARGETS

(71) Applicant: Microsoft Technology Licensing, LLC, Redmond, WA (US)

(72) Inventors: Michael Anthony Brown, McKinney, TX (US); Ronald Mark Parker, Manchester, MA (US); Bahareh Sadeghi, Vancouver, WA (US); Mark Gordon Libby, Groton, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 17/727,411

(22) Filed: Apr. 22, 2022

(65) Prior Publication Data
US 2023/0344714 A1    Oct. 26, 2023

(51) Int. Cl.
*H04L 41/0869* (2022.01)
*H04L 41/0853* (2022.01)

(52) U.S. Cl.
CPC ...... *H04L 41/0853* (2013.01); *H04L 41/0869* (2013.01)

(58) Field of Classification Search
CPC ... H04L 41/0853; H04L 41/085; H04L 41/40; H04L 67/34; H04L 41/0869
See application file for complete search history.

(56) References Cited

U.S. PATENT DOCUMENTS

| | | | |
|---|---|---|---|
| 8,306,996 B2 * | 11/2012 | Nanjangud Bhaskar | ................... G06F 8/10 707/782 |
| 8,812,276 B2 * | 8/2014 | Aldrich | ............... G06F 11/3608 703/2 |

(Continued)

FOREIGN PATENT DOCUMENTS

| | | | | |
|---|---|---|---|---|
| CN | 112104473 A | 12/2020 | | |
| EP | 2117266 A1 * | 11/2009 | ............. | H04L 1/243 |

(Continued)

OTHER PUBLICATIONS

Peter Szilagyi; "I2BN: Intelligent Intent Based Networks"; May 31, 2021; River Publishers; Journal of ICT Standardization, vol. 92,159-200; retrievable online from https://journals.riverpublishers.com/index.php/JICTS/article/view/6301/5775 (Year: 2021).*

(Continued)

*Primary Examiner* — Sandarva Khanal
(74) *Attorney, Agent, or Firm* — ArentFox Schiff LLP

(57) ABSTRACT

Described are examples for providing intent based network configuration with a two-tiered reconciliation model for adapting a global intent to a plurality of local intent declarations for respective regions. A system for network configuration may include a global reconciliation engine configured to: receive a global intent including requirements, goals, and constraints for a network; generate a plurality of local intent declarations from the global intent, each respective local intent declaration being for a respective region that hosts network functions; and reconcile a plurality of the (Continued)

local configurations with the global intent. The system may include a plurality of local reconciliation engines configured to reconcile a local configuration of the network functions hosted in the respective region with the respective local intent declaration.

12 Claims, 7 Drawing Sheets

(56) References Cited

U.S. PATENT DOCUMENTS

| | | | |
|---|---|---|---|
| 10,510,336 B2 | 12/2019 | Amid et al. | |
| 10,601,932 B2* | 3/2020 | Kodaypak | H04L 41/0806 |
| 10,608,895 B2* | 3/2020 | Shaw | H04L 67/61 |
| 10,657,208 B2* | 5/2020 | Han | G06F 30/3323 |
| 11,012,872 B1* | 5/2021 | Bellamkonda | H04L 41/0823 |
| 11,283,691 B1* | 3/2022 | A | H04L 41/145 |
| 11,963,094 B2* | 4/2024 | Cai | H04W 8/18 |
| 2018/0077024 A1* | 3/2018 | Zhang | H04L 41/12 |
| 2018/0278466 A1* | 9/2018 | McCormick | H04L 41/0896 |
| 2018/0358001 A1* | 12/2018 | Amid | G06F 16/3329 |
| 2019/0182177 A1* | 6/2019 | Bugenhagen | H04L 47/56 |
| 2020/0052969 A1* | 2/2020 | Xu | H04L 41/0813 |
| 2020/0178093 A1* | 6/2020 | Peng | H04W 36/00837 |
| 2020/0186411 A1* | 6/2020 | Ravichandran | H04L 41/0668 |
| 2021/0158835 A1* | 5/2021 | Hill | G06F 40/30 |
| 2021/0176192 A1* | 6/2021 | Li | H04L 47/781 |
| 2021/0266269 A1* | 8/2021 | McBride | H04L 41/14 |
| 2022/0116335 A1* | 4/2022 | Sharma Banjade | H04W 24/02 |
| 2022/0121455 A1* | 4/2022 | Hoban | G06Q 10/087 |
| 2022/0342649 A1* | 10/2022 | Cao | G06F 9/5005 |
| 2023/0409734 A1* | 12/2023 | McCarley | G06F 21/6245 |

FOREIGN PATENT DOCUMENTS

| | | | | |
|---|---|---|---|---|
| EP | 3620920 A1 * | 3/2020 | | G06F 9/5027 |
| EP | 3722944 A1 * | 10/2020 | | G06F 16/9024 |
| WO | WO-2009006026 A2 * | 1/2009 | | G06F 8/10 |
| WO | WO-2009055751 A1 * | 4/2009 | | G06F 8/10 |
| WO | WO-2018130279 A1 * | 7/2018 | | H04W 16/16 |
| WO | WO-2020173541 A1 * | 9/2020 | | G06F 9/5077 |
| WO | WO-2022258813 A1 * | 12/2022 | | |
| WO | WO-2023274515 A1 * | 1/2023 | | |
| WO | WO-2023172292 A2 * | 9/2023 | | G06N 20/00 |

OTHER PUBLICATIONS

Wei et al.; "Intent-based networks for 6G: Insights and challenges"; Chongqing University of Posts and Telecommunications; Digital Communications and Networks 6 (2020) 270-280; Available online Jul. 15, 2020; Retrieved from https://doi.org/10.1016/j.dcan.2020.07.001. (Year: 2020).*

"International Search Report and Written Opinion Issued in PCT Application No. PCT/US23/012457", Mailed Date: May 8, 2023, 14 Pages.

Szilagyi, Peter, "I2BN: Intelligent Intent Based Networks", in Journal of ICT Standardization, vol. 9, Issue 2, Jun. 8, 2021, pp. 159-200.

* cited by examiner

GLOBAL INTENT-BASED CONFIGURATION TO LOCAL INTENT TARGETS

BACKGROUND

A radio access network (RAN) may provide multiple user devices with wireless access to a network. The user devices may wirelessly communicate with a base station, which forwards the communications towards a core network. A core network may include multiple nodes or functions. For example, a 5G core network may include one or more Access and Mobility Management Functions (AMFs), Session Management Functions (SMFs), and a User Plane Functions (UPFs). For instance, the AMF may be a control node that processes the signaling between the UEs and the core network. Generally, the AMF provides quality of service (QoS) flow and session management. All user Internet protocol (IP) packets are transferred through the UPF. The UPF provides UE IP address allocation as well as other functions. The UPF may be connected to IP Services. The IP Services may include the Internet, an intranet, an IP Multimedia Subsystem, a packet switched (PS) Streaming Service, and/or other IP services.

A virtualized radio access network may utilize datacenters with generic computing resources for performing RAN processing for network functions. For example, instead of performing PHY and MAC layer processing locally on dedicated hardware, a virtualized radio access network may forward radio signals from the radio units to an edge datacenter for processing and similarly forward signals from the edge datacenter to the radio units for wireless transmission. As another example, core network functions may be implemented on generic cloud resources at various datacenters. Because the network datacenters utilize generic computing resources, a virtualized RAN may provide scalability and fault tolerance for network processing. Conventionally, whether using dedicated hardware or more generic computing resources, network configuration has been performed by pushing a network configuration down to lower level management functions until each network function is configured. Multiple network functions deployed in multiple regions or sites may share a common, network-wide configuration. This allows the collection of network function (NFs) to offer, as a whole, a network service.

In complex systems, such as cellular networks in general and in cloud-based virtualized deployments specifically, variations in system resources and network conditions may result in inefficiencies with a common network-wide configuration of network functions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system for network configuration, including: a global reconciliation engine configured to: receive a global intent including requirements, goals, and constraints for a network; generate a plurality of local intent declarations from the global intent, each respective local intent declaration being for a respective region that hosts network functions; reconcile a plurality of the local configurations with the global intent; and a plurality of local reconciliation engines configured to reconcile a local configuration of the network functions hosted in the respective region with the respective local intent declaration.

In some aspects, the techniques described herein relate to a system, further including an intent target associated with one or more of the plurality of local reconciliation engines configured to execute a workload associated with the respective region to generate the local configuration.

In some aspects, the techniques described herein relate to a system, wherein the global reconciliation engine is configured to generate the plurality of local intent declarations based on metadata that is applied to the global intent.

In some aspects, the techniques described herein relate to a system, wherein to generate the plurality of local intent declarations based on the metadata, the global reconciliation engine is configured to omit, add, or modify an element with respect to the global intent for a respective local intent declaration based on the metadata.

In some aspects, the techniques described herein relate to a system, wherein the global intent is for a network slice of a radio access network (RAN) and specifies a region for at least two types of network functions, wherein the metadata identifies attributes of each of the at least two types of network functions, wherein the global reconciliation engine is configured to select attributes for each of the local intent declarations based on the type of network function specified for the respective region matching the attributes of each of the at least two types of network functions.

In some aspects, the techniques described herein relate to a system, wherein the global reconciliation engine is configured to: receive a new intent at the global reconciliation engine; recalculate the plurality of local intent declarations from the new intent; and provide incremental information to each of the local reconciliation engines based on a difference between a respective recalculated local intent declaration and the respective local intent declaration.

In some aspects, the techniques described herein relate to a system, wherein generating the local intent declarations is based on feedback from the local reconciliation engines.

In some aspects, the techniques described herein relate to a system, wherein to generate the plurality of local intent declarations from the global intent, the global reconciliation engine is configured to: combine a plurality of global intents including the global intent into a combined global intent; and generate the plurality of local intent declarations based on the combined global intent.

In some aspects, the techniques described herein relate to a method of network configuration, including: receiving a global intent including requirements, goals, and constraints for a network; generating, by a global reconciliation engine, a plurality of local intent declarations from the global intent, each respective local intent declaration being for a respective region that hosts network functions; reconciling, at each of a plurality of local reconciliation engines, a local configuration of the network functions hosted in the respective region with the respective local intent declaration; and reconciling, by the global reconciliation engine, a plurality of the local configurations with the global intent.

In some aspects, the techniques described herein relate to a method, further including tagging the global intent with metadata, wherein generating the plurality of local intent declarations is based on the metadata.

In some aspects, the techniques described herein relate to a method, wherein generating the plurality of local intent declarations based on the metadata includes omitting, adding, or modifying an element with respect to the global intent for a respective local intent declaration based on the metadata.

In some aspects, the techniques described herein relate to a method, wherein omitting the element of the global intent is in response to the metadata associated with the element matching or not matching a property of the respective region for the respective local intent declaration.

In some aspects, the techniques described herein relate to a method, wherein adding the element with respect to the global intent is in response to the metadata identifying additional information for the respective region for the respective local intent declaration.

In some aspects, the techniques described herein relate to a method, wherein modifying the element with respect to the global intent is in response to the metadata associated with the element identifying a rule for the respective region for the respective local intent declaration.

In some aspects, the techniques described herein relate to a method, wherein the global intent is for a network slice of a radio access network (RAN) and specifies a region for at least two types of network functions, wherein the metadata identifies attributes of each of the at least two types of network functions, further including: selecting attributes for each of the local intent declarations based on the type of network function specified for the respective region matching the attributes of each of the at least two types of network functions.

In some aspects, the techniques described herein relate to a method, further including: receiving a new intent at the global reconciliation engine; recalculating the plurality of local intent declarations from the new intent; and providing incremental information to each of the local reconciliation engines based on a difference between a respective recalculated local intent declaration and the respective local intent declaration.

In some aspects, the techniques described herein relate to a method, further including executing a workload at an intent target associated with the respective region to generate the local configuration.

In some aspects, the techniques described herein relate to a method, wherein generating the local intent declarations is based on feedback from the local reconciliation engines.

In some aspects, the techniques described herein relate to a method, wherein generating the plurality of local intent declarations from the global intent includes: combining a plurality of global intents including the global intent into a combined global intent; and generating the plurality of local intent declarations based on the combined global intent.

In some aspects, the techniques described herein relate to a non-transitory computer-readable medium storing computer-executable code, including code to: receive a global intent including requirements, goals, and constraints for a network; generate a plurality of local intent declarations from the global intent, each respective local intent declaration being for a respective region that hosts network functions; send the plurality of local intent declarations to each of a plurality of local reconciliation engines configured to reconcile a local configuration of the network functions hosted in the respective region with the respective local intent declaration; and reconcile a plurality of the local configurations with the global intent.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
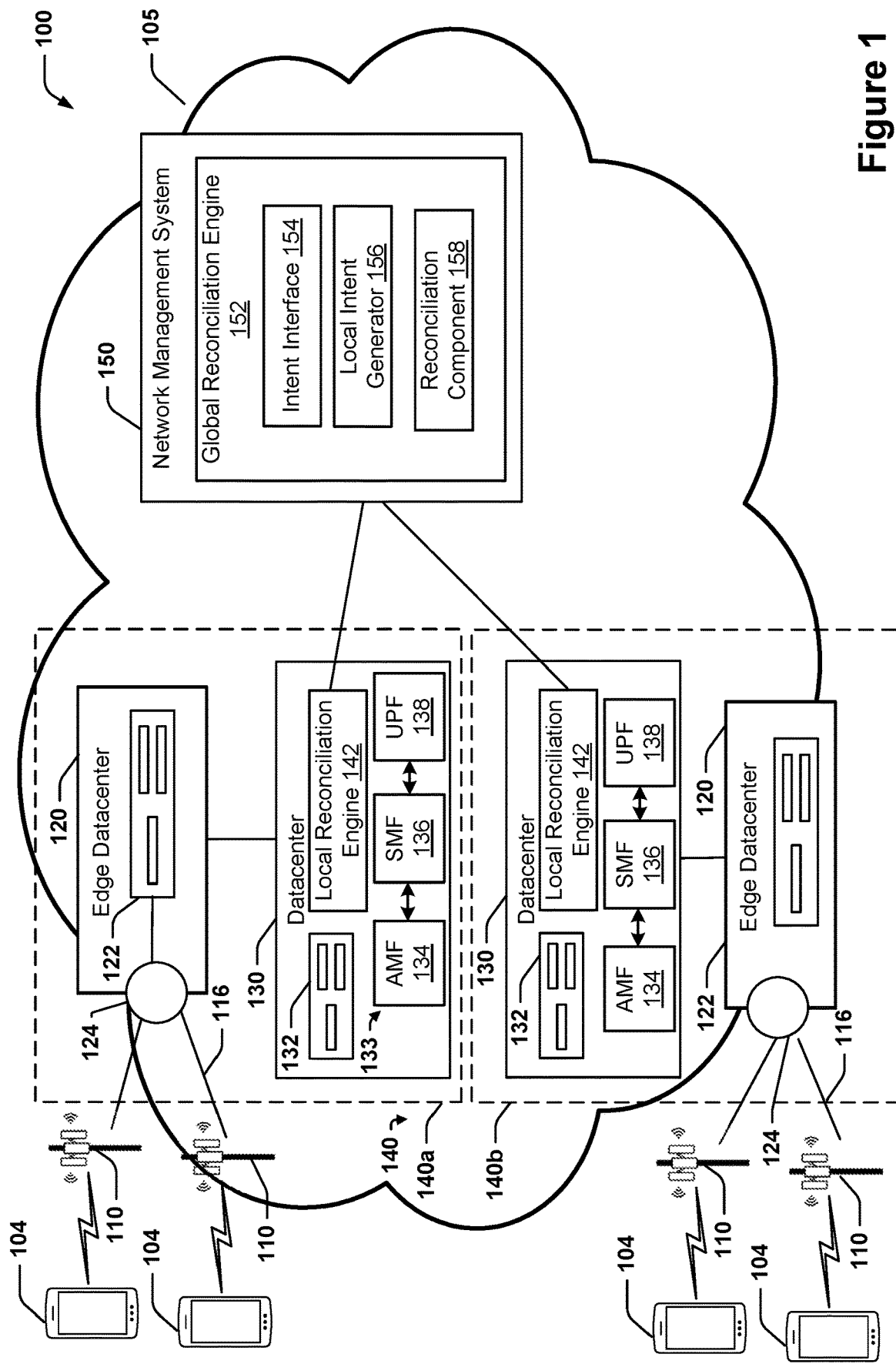
FIG. 1 is a diagram of an example of an architecture for network management of a virtualized radio access network (RAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

The concept of intent driven network management allows a client to specify a specific goal (or intent declaration) to be satisfied within a set of specific expectations (also referred to as contexts). An intent-client may provide an intent declaration including requirements, goals, and constraints. An intent declaration may also be referred to as an intent target or intent expectation. The server, e.g., the intent-handler or the service provider, provides the client with updates regarding the status of the intent. If the server cannot achieve the goal specified as the intent, then the server may reject the intent. If a satisfied intent is degraded and no longer fully satisfied, the server notifies the client of the degradation. The client then may choose to update the intent and set a new goal.

Using an intent-based paradigm, a global configuration model may be viewed as a global intent that is applied to each of the NFs that comprise a network. The NFs may be referred to as intent targets, with each intent target taking on a specific role in the network service as the global intent converges to a local copy and is applied to the individual NFs. This can be described as a fan-out of the global intent to each of the regions or sites that host NFs. Additionally, at each region or site there is a fan-out of the configuration derived from the global intent to each of the deployed NFs.

In complex systems, such as cellular networks in general and in cloud-based virtualized deployments specifically, the variations in system resources and network conditions may result in inefficiencies of a global configuration, whether under an intent-based paradigm or conventional global configuration. For example, a region may have particular needs based on the network resources or a user base in the region, but a global configuration may not satisfy such particular needs. As another example, a region may include particular local capabilities that are not exposed through a global configuration.

In an aspect, this disclosure describes various examples related to a two-tiered reconciliation model that allows a global intent to be optimized on a per-intent target basis. A global reconciliation engine may receive the global intent, generate a plurality of local intent declarations corresponding to different regions, and provide the local intent declarations to respective local reconciliation engines. The local reconciliation engines may reconcile the respective local intent declarations with a respective local configuration for the region. The global reconciliation may then reconcile the plurality of local configurations with the global intent. In some implementations, the global reconciliation engine is configured to generate the plurality of local intent declarations is based on metadata that is applied to the global intent. For example, the global reconciliation engine may omit, add, or modify an element with respect to the global intent for a respective local intent declaration based on the metadata.

The two-tiered reconciliation model allows much more granular targeting of the global intent to the specific targets as well as the tailoring of the global intent to the needs of a specific intent target. For example, local reconciliation of a local configuration with a local intent declaration for a region allows adaptation of global network configuration to specific needs and resources of a region to achieve better performance or lower costs. For instance, the local reconciliation engine may allocate resources that have a lower cost rather than configuring higher cost resources specified by a global configuration. As another example, generation of local intent declarations based on metadata provides automated customization of the intent declaration for a region based on global metadata and information about the region. Accordingly, a network operator may specify metadata for customizing the local intent declarations without a need for the network operator to specify the intent for each region individually.

Figure 3:
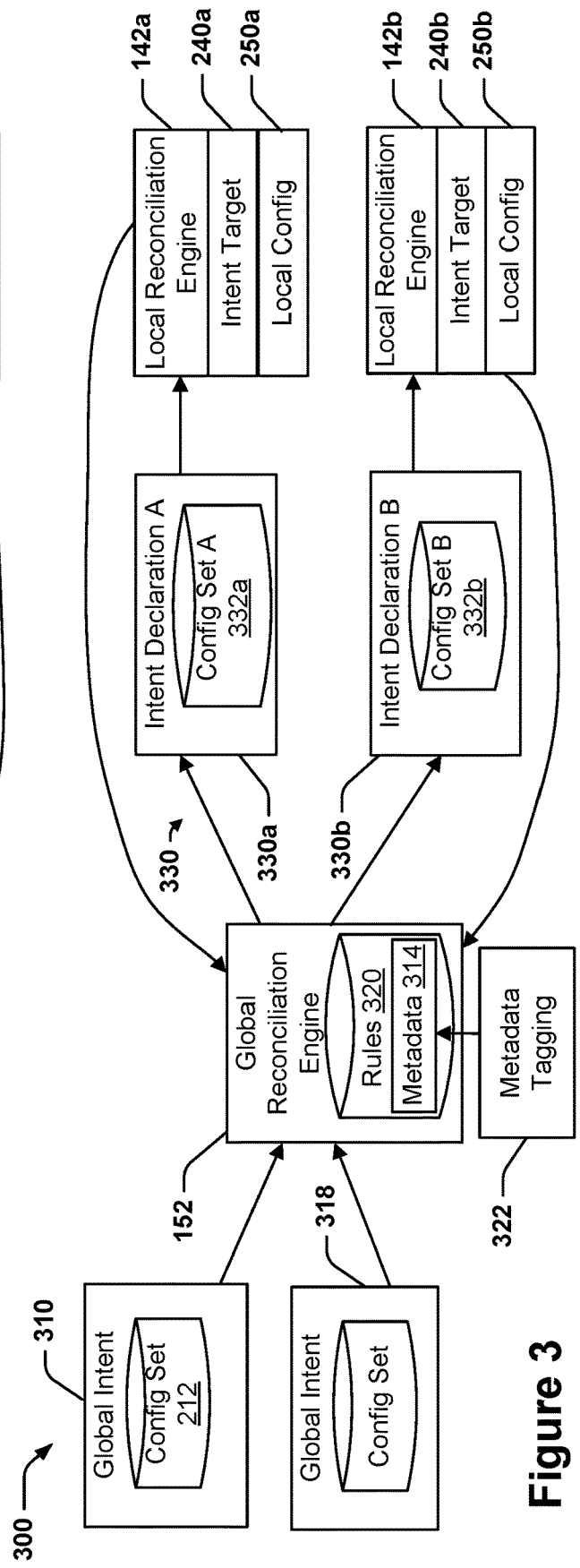
FIG. 3 is a diagram of a second example architecture for a two-tiered intent based reconciliation model utilizing metadata, in accordance with aspects described herein.
Figure 4:
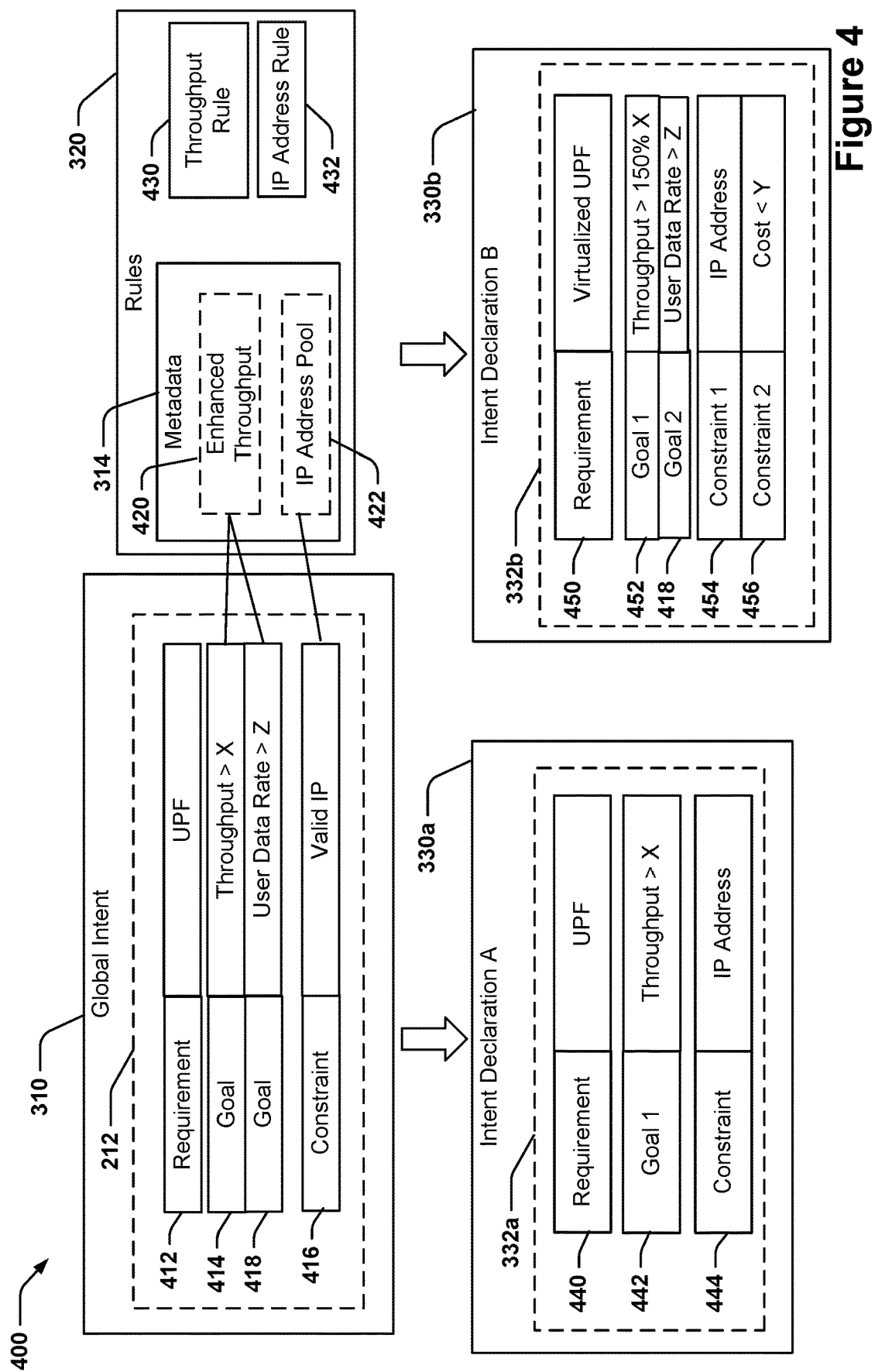
FIG. 4 is diagram of example global intents and intent declarations for different regions including example parameters of the respective configuration sets, in accordance with aspects described herein.
Figure 5:
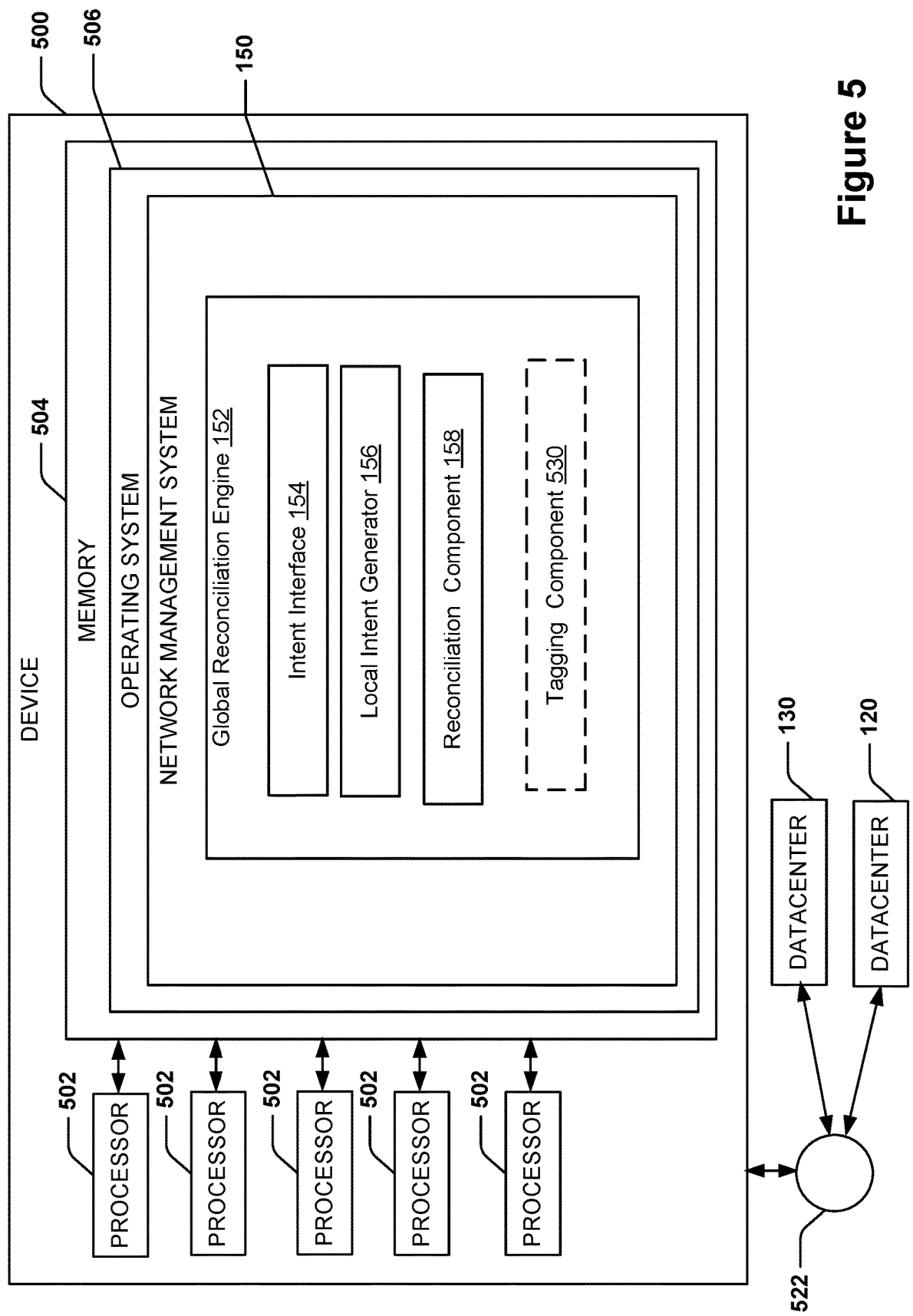
FIG. 5 is a schematic diagram of an example of a device for two-tiered intent based network configuration, in accordance with aspects described herein.
Figure 6:
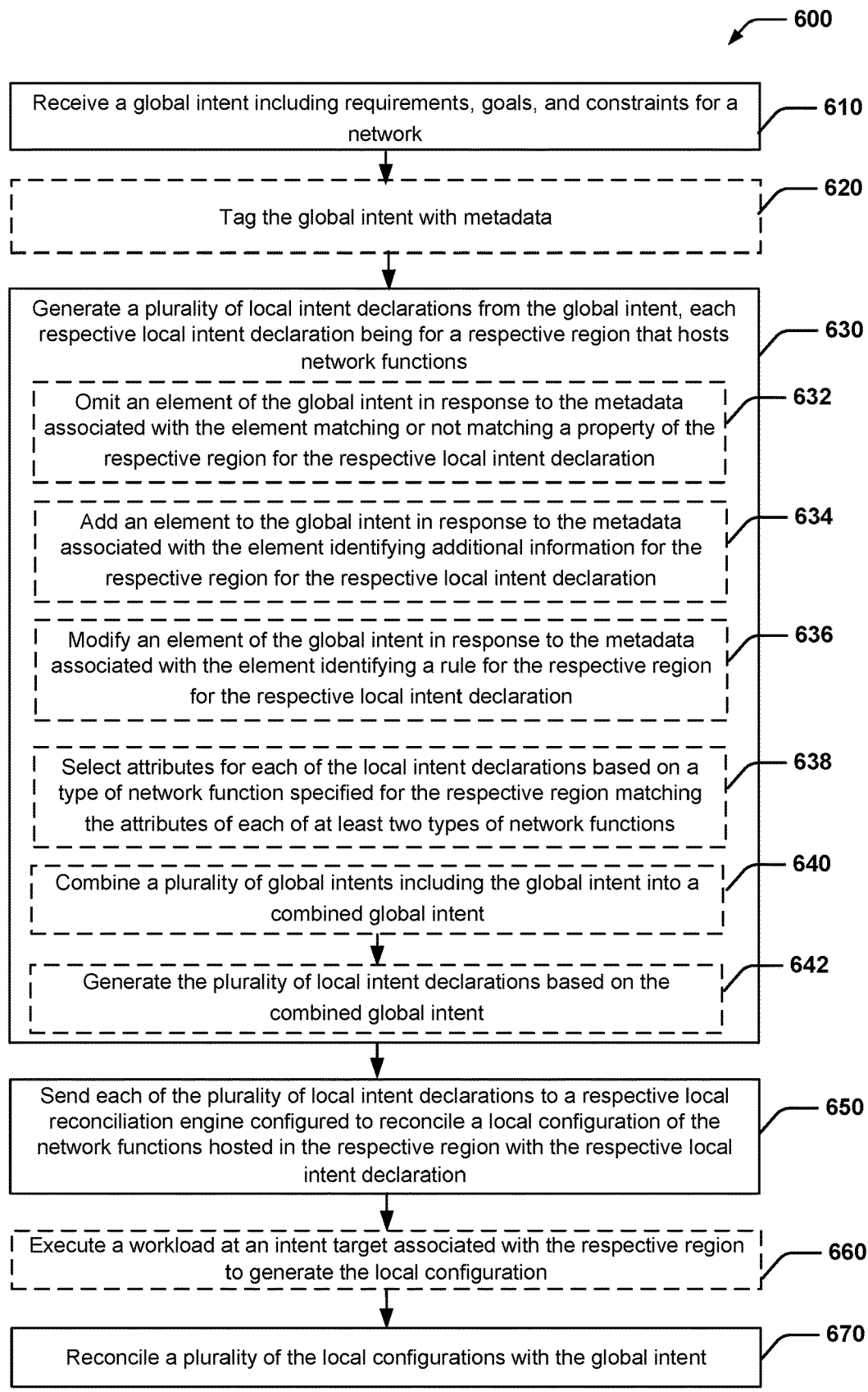
FIG. 6 is a flow diagram of an example of a method of configuring a network, in accordance with aspects described herein.

Turning now to FIGS. 1-8, examples are depicted with reference to one or more components and one or more methods that may perform the actions or operations described herein, where components and/or actions/operations in dashed line may be optional. Although the operations described below in FIGS. 5 and 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of an architecture for management of a virtualized RAN 100. The virtualized RAN 100 may be implemented on a cloud network 105 to provide access for user equipment (UEs) 104. The virtualized RAN 100 may include radio units 110, one or more edge datacenters 120, one or more datacenters 130, and a network management system 150. The edge datacenters 120 and datacenters 130 may be divided into regions 140.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include computing resources 122 and a switch 124, which may be connected to RUs 110 via the front-haul connections 116. The edge datacenter 120 may provide a virtualized base station for performing RAN processing for one or more cells. For example, the computing resources 122 may be hardware servers or virtual servers. The servers may be generic computing resources that can be configured to perform specific RAN protocol stacks including, for example, physical (PHY) layer, media access control (MAC) layer protocol stacks, radio link control (RLC) layer, and a radio resource control (RRC) layer. In some implementations, PHY layer processing may be more resource intensive than higher layer processing and may benefit from performance close to the RUs 110. The computing resources 122 may be connected to the switch 124 and to each other via connections, which may be wired connections such as Ethernet.

The datacenter 130 may include computing resources 132. Unlike the edge datacenter 120, the datacenter 130 may lack a direct connection to RUs 110. Generally, the datacenter 130 may be more centrally located, be connected to multiple other datacenters, and/or have greater computing resources 132 than an edge datacenter 120. In some implementations, higher layer network functions and/or core network functions may be performed at a datacenter 130. For example, the datacenter 130 may instantiate network functions (NFs) 133 such one or more Access and Mobility Management Function (AMFs) 134, a Session Management Function (SMF) 136, and a User Plane Function (UPF) 138.

In an aspect, the datacenters 130 and edge datacenters 120 may be grouped into regions 140 (e.g., region 140a and region 140b). Each region 140 may include respective NFs 133 for providing a service within the region. For example, each region 140 may include one or more AMFs 134, SMFs 136, and UPFs 138. In an aspect, each region 140 may include a local reconciliation engine 142 that is configured to reconcile a local configuration (e.g., of the NFs) with a local intent declaration for the region to ensure that the local configuration satisfies the local intent declaration.

The network management system 150 may provide a network operator with tools for configuring the virtualized RAN 100. In an aspect, the network management system 150 provides two-tiered intent based reconciliation model for configuration of the virtualized RAN 100. An intent specifies the expectations including requirements, goals, and constraints for a specific service or network management workflow. An intent is typically understandable by humans, and also can be interpreted by a machine without any ambiguity. In contrast to a configuration that specifies how a network is to perform, an intent expresses what a network should achieve. For example, an intent may express the metrics that are be achieved and not how to achieve the metrics. The two-tiered intent based reconciliation model may include a global intent that defines the service that the virtualized RAN 100 is to provide and a plurality of local intent declarations that are specific for each region 140.

The network management system 150 may include a global reconciliation engine 152 configured to implement a top tier of the two-tiered intent based reconciliation model. The global reconciliation engine 152 may include an intent interface 154 configured to receive a global intent including requirements, goals, and constraints for a network. The global reconciliation engine 152 may include a local intent generator 156 configured to generate a plurality of local intent declarations from the global intent, each respective local intent declaration being for a respective region 140 that hosts network functions. The global reconciliation engine 152 may include a reconciliation component 158 configured to reconcile a plurality of the local configurations with the global intent.

In some implementations, the network management system 150 operates on a slice based paradigm using network management functions arranged in a hierarchical order. For instance, the network management system 150 may include network management functions such as a communication service management function (CSMF), network slice management function (NSMF), a network slice subnet management function (NSSMF), a network function management function (NFMF), or a network function (NF). Each management function may provide an intent to a lower level management function. In some implementations, the network management system 150 may be implemented on cloud resources such as a datacenter 130. In other implementations, the network management system 150 may be external to the cloud network 105 and may communicate with the cloud network via a cloud/container infrastructure management service.

Figure 2:
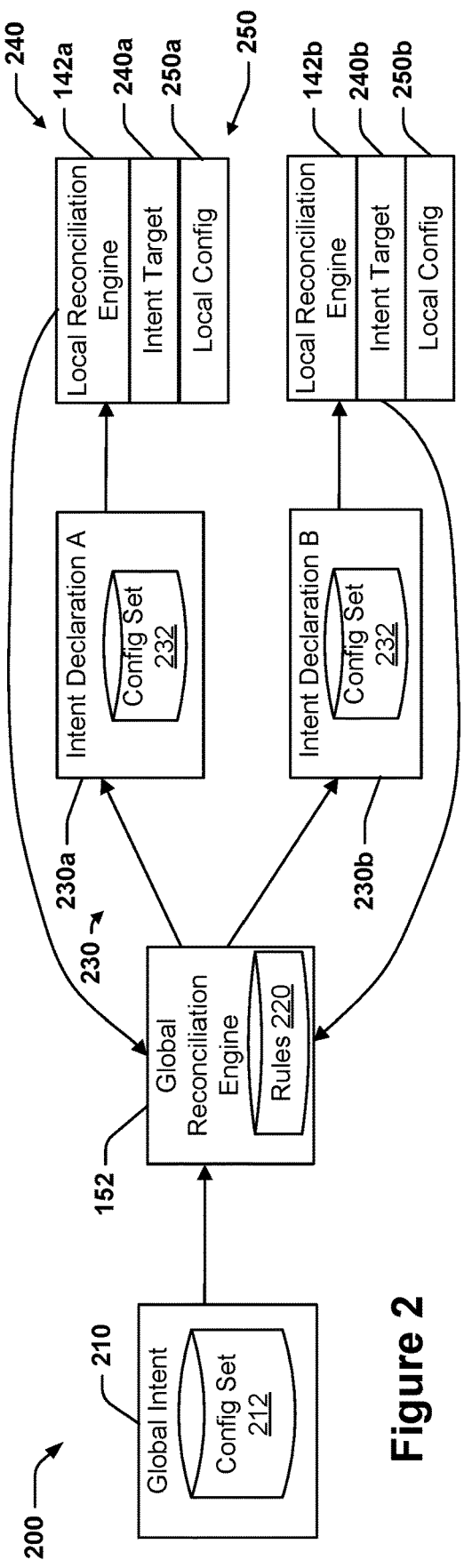
FIG. 2 is a diagram of a first example architecture for a two-tiered intent based reconciliation model, in accordance with aspects described herein.

FIG. 2 is a diagram of a first example architecture 200 for a two-tiered intent based reconciliation model. A global intent 210 may represent expectations for a network service. The global reconciliation engine 152 may generate a plurality of intent declarations 230. Each intent declaration 230 may be provided to a local reconciliation engine 142 (e.g., local reconciliation engines 142a and 142b) corresponding to a respective region 140. The local reconciliation engine 142 and/or an intent target 240 may generate a local configuration 250 based on the intent declaration 230. The local reconciliation engine 142 may reconcile the local configuration 250 with the intent declaration 230. The local reconciliation engine 142 may provide the local configuration 250 back to the global reconciliation engine 152, which may reconcile the plurality of local configurations 250 with the global intent 210.

The global intent 210 may be received from a network operator and/or a higher level management function. For example, the network management system 150 and/or the global reconciliation engine 152 may expose the intent interface 154 for receiving the global intent 210. For example, the intent interface 154 may be an application programming interface (API) that defines a format of content for the global intent 210. For instance, the global intent 210 may include a configuration set 212 that defines expectations for the network service. For instance, the configuration set 212 may define the expectations as metrics to be achieved by the network service.

In some implementations, the global intent 210 is for a network slice of a RAN. For instance, the network slice may be intended to provide wireless Internet access for a geographic area. The configuration set 212 may include metrics such as data rates, latency, or numbers of devices. In some implementations, e.g., for lower level network management functions such as a NFMF, the configuration set 212 may include some implementation details such as a number of types of network functions, or parameters for each of the network functions.

The global reconciliation engine 152 may be configured with rules 220 for generating a plurality of local intent declarations 230 based on the global intent 210. Each intent declaration 230 may be similar to the global intent 210 and represent expectations for a network service and include a config set 232. In contrast to the global intent 210, the intent declarations 230 may correspond to a specific region 140. In some implementations, the global reconciliation engine 152 may derive the config set 232 directly from the config set 212. For example, the rules 220 may simply specify that each parameter of the config set 212 is to be copied to a corresponding parameter for the config set 232. Accordingly, a config set 232 for an intent declaration 230a may be similar to a config set 232 for an intent declaration 230b.

The intent targets 240 may be local entities that satisfy an intent declaration according to a local configuration. For example, the intent targets 240 may include network functions instantiated on computing resources 122, 132 or an infrastructure management service configured to instantiate the functions. In some implementations, the intent targets 240 generate the local configuration based on the intent declaration 230. For instance, an infrastructure management service may determine the computing resources 122, 132 necessary to satisfy the intent declaration 230. In other implementations, the local reconciliation engine 152 generates the local configuration and the intent target 240 implements the local configuration. In either case, the local reconciliation engine 142 is responsible for reconciling the local configuration with the intent declaration 230. For instance, the local reconciliation engine 142 may determine that the local configuration allocates sufficient resources to satisfy the intent declaration and monitor the instantiated network functions to determine whether the allocated resources perform as configured to satisfy the intent declaration. The local reconciliation engine 142 may provide the local configuration and/or feedback (e.g., monitored metrics) to the global reconciliation engine 152.

FIG. 3 is a diagram of a second example architecture 300 for a two-tiered intent based reconciliation model utilizing metadata 314. A global intent 310 may be similar to the global intent 210 and represent expectations for a network service. In addition to the config set 212 of the global intent 310, the global reconciliation engine 152 may generate the local intent declarations 330 based on metadata 314. The metadata 314 may be information that is used to define a local intent but not necessarily included in the plurality of local intent declarations 330. The metadata 314 may be applied to parameters of the global intent 310 and/or properties of a region. For example, the metadata 314 may define whether a parameter of the global intent 310 is relevant to a region by indicating properties of a relevant region. As another example, the metadata may describe a permissible range or variation for a parameter.

The global reconciliation engine 152 may be configured with rules 320 to generate the intent declarations 330 based on the metadata 314. For example, the rules 320 may include rules to omit, add, or modify an element with respect to the global intent for a respective local intent declaration 330 based on the metadata 314. In some implementations, the global reconciliation engine 152 may execute a metadata tagging operation 322. The metadata tagging operation 322 may be based on guidance for how to generate the local intent declarations 330. For instance, the metadata tagging operation 322 may define rules 320 for modifying the global intent 310 based on the metadata 314. In some implementations, the metadata tagging operation may include receiving the metadata 314 via a user interface or an API. The global reconciliation engine 152 may then apply the rules 320 to the metadata 314 and the global intent 310 to determine how to modify the relevant elements of the config set 212. For example, the rules 320 may indicate an action defined by the metadata 314 to be performed when an element of the configuration set 212 matches a property of a region. Because each local reconciliation engine 142 may indicate different properties, the intent declarations 330 may be different. For example, the intent declaration 330a may include a config set 332a and the intent declaration 330b may include a config set 332b. The local reconciliation engine 142 may reconcile the respective intent declaration 330 with a local configuration as discussed above with respect to FIG. 2.

In an aspect, the architecture 300 may receive multiple global intents 310. For example, the multiple global intents 310 may include an original global intent 310 and a new global intent 318 for the same service. For instance, the new global intent 318 may update parameters of the original global intent. The global reconciliation engine 152 may recalculate the plurality of local intent declarations 330 from the new global intent 318. The global reconciliation engine 142 may provide incremental information to each of the local reconciliation engines based on a difference between a respective recalculated local intent declaration and the respective local intent declaration 330. As another example, the multiple global intents 310 may include intents for the same service from different sources. For example, the global reconciliation engine 152 may receive a user defined intent defining high level performance metrics and receive a second global intent from a higher layer management function that defines more specific details. For instance, at the NFMF level, a NSSMF may provide a global intent 310 that defines a number of NFs needed in each region via the metadata 314. The global reconciliation engine 152 may combine multiple intents for the same service into a combined global intent and generate the local intent declarations based on the combined global intent.

FIG. 4 is diagram 400 of example global intents 310 and intent declarations 330 for different regions including example parameters of the respective config sets 212, 332a, and 332b. In some implementations, each intent may define requirements, goals, and constraints for a service. For instance, the global intent 310 may include one or more requirements 412, one or more goals 414, and one or more constraints 416. The requirements 412, goals 414, and constraints 416 may be referred to as elements of the configuration set 212. The requirement 412 may, for example, specify a network function that needs to be provided. In the illustrated example, a UPF may be needed to provide Internet service to each user. An example goal 414 may indicate a performance metric of the UPF such as a minimum throughput and an example goal 418 may indicate a user data rate. An example constraint 416 may indicate that the UPF needs a valid IP address.

The global reconciliation engine 152 may be configured with rules 320, which may provide actions for omitting, adding, or modifying an element with respect to the global intent for a respective local intent declaration based on the metadata 314. For instance, the metadata 314 may include an enhanced throughput 420 may define one or more levels of enhancement such as scaling factors that may be applicable to regions with enhanced demands or enhanced capabilities. As another example, the metadata 314 may include an IP address pool 422. A global intent 310 may not be able to define a specific IP address for the UPF as multiple instances of the UPF may be implemented. By defining an IP address pool 422, the metadata 314 may provide guidance while still allowing the local reconciliation engines 142 to make decisions at the local level. For example, the rules 320 may include a throughput rule 430 and an IP address rule 432. The throughput rule 430 may indicate to enhance the throughput goal for a region based on the enhanced throughput 420 when a region is tagged for enhanced throughput. For instance, the region 140b may be tagged for enhanced throughput, but not the region 140a. Accordingly, a goal 452 in the intent declaration 330b may be modified to specify an enhanced throughput (e.g., Throughput>150% X) compared to a goal 442 in the intent declaration 330a (e.g., Throughput>X). As another example, the goal 418 for user data rate may be omitted when a property of the region 140a does not match the enhanced throughput metadata. In some implementations, the IP address rule 432 may resolve an IP address pool 422 to a particular IP address. Accordingly, each of the constraint 444 for intent declaration 330a and the constraint 454 for intent declaration 330b may specify a different IP address. In some implementations, the global reconciliation engine 152 may refine an element for a region based on capabilities or feedback provided for the region 140. For instance, if region 140a indicates presence of specific hardware such as an embedded system for a network function and region 140b indicates only generic computing resources, the requirement 440 of intent declaration 330a may indicate a generic requirement of a UPF that can be satisfied by either the specific hardware or a virtualized UPF, whereas the requirement 450 of intent declaration 330b may specify a virtualized UPF. As another example, the global reconciliation engine 152 may add an element to the global intent in response to the metadata identifying additional information (e.g., a cost constraint 456) for the respective region 140b for the respective local intent declaration 330b.

FIG. 5 is a schematic diagram of an example of a device 500 (e.g., a computing device) for network configuration. The device 500 may be an example of a computing resource 132 such as a server at a datacenter 130 that hosts the network management system 150 and/or the global reconciliation engine 152. The device 500 is connected to other servers within the datacenter via a switch 522 and may be connected to servers at other datacenters.

In an example, device 500 can include one or more processors 502 and/or memory 504 configured to execute or store instructions or other parameters related to providing an operating system 506, which can execute one or more applications or processes, such as, but not limited to, a global reconciliation engine 152. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like.

Memory 504 may store instructions, parameters, data structures, etc. for use/execution by processor 502 to perform functions described herein.

In an example, the network management system 150 and/or the global reconciliation engine 152 may include an intent interface 154, a local intent generator 156, and a reconciliation component 158. The network management system 150 and/or the global reconciliation engine 152 may optionally include a tagging component 530.

The intent interface 154 may be configured to receive a global intent 210, 310 from a user or a higher level management function. For example, the intent interface 154 may expose an API that interacts with a user interface or the higher level management function. The intent interface 154 may process the global intent 210, 310 to identify the elements of the config set 212 and the metadata 314. The intent interface 154 may provide the config set 212 and the metadata 314 to the local intent generator 156.

In some implementations, the tagging component 530 may be configured to perform the metadata tagging operation 322. For example, the tagging component 530 may receive tags indicating properties of the regions 140 from the local reconciliation engines 142. The tagging component 530 may match the tags with the metadata 314. The tagging component 530 may provide an indication of matches or lack of matches to the local intent generator 156.

The local intent generator 156 may be configured to generate the local intent declarations 230, 330 based on the global intent 210, 310. In some implementations, the local intent generator 156 may copy elements of the global intent 210 to the local intent declarations 230. In some implementations, the local intent generator 156 may omit, add, or modify elements with respect to the global intent 210 for the local intent declarations 230 based on the metadata. For example, the local intent generator 156 may apply the rules 320 to the metadata 314 and/or tags for the regions 140. The local intent generator 156 may provide the local intent declarations 230, 330 to respective local reconciliation engines 142.

The reconciliation component 158 may be configured to reconcile a plurality of the local configurations with the global intent. The reconciliation component 158 may receive the plurality of local configurations 250 from the local reconciliation engines 142. In some implementations, the local reconciliation engines 142 may indicate that the respective local configuration 250 satisfies the local intent declaration 230, 330. In some implementations, the local reconciliation engines 142 may provide metrics for the respective local configuration 250. The reconciliation component 158 may receive the global intent 210, 310 from the intent interface 154. In some implementations, the reconciliation component 158 may confirm that each of the local reconciliation engines 142 has indicated that the local intent declaration is satisfied to determine that the global intent 210, 310 is satisfied. In some implementations, the reconciliation component 158 may determine aggregate metrics to determine whether the global intent 210, 310 is satisfied. The reconciliation component 158 may report a status of the global intent 210, 310 to a user or higher layer network management function.

FIG. 6 is a flow diagram of an example of a method 600 for network configuration based on a two-tiered intent based reconciliation model. For example, the method 600 can be performed by a device 500 and/or one or more components thereof to instantiate one or more network functions within a cloud network 105 to provide a network service.

At block 610, the method 600 includes receiving a global intent including requirements, goals, and constraints for a network. In an example, the intent interface 154 of the global reconciliation engine 152, e.g., in conjunction with processor 502, memory 504, and operating system 506, can receive a global intent 210, 310 including requirements 412, goals 414, and constraints 416 for a network.

At block 620, the method 600 may optionally include tagging the global intent with metadata. In an example, the tagging component 530 of the global reconciliation engine 152, e.g., in conjunction with processor 502, memory 504, and operating system 506, can tag the global intent with metadata 314.

At block 630, the method 600 includes generating a plurality of local intent declarations from the global intent, each respective local intent declaration being for a respective region that hosts network functions. In an example, the local intent generator 156 of the global reconciliation engine 152, e.g., in conjunction with processor 502, memory 504, and operating system 506, can generate the plurality of local intent declarations 330 from the global intent 210, 310, each respective local intent declaration 330 being for a respective region 140 that hosts network functions.

In some implementations, at sub-block 632, the block 630 may optionally include omitting an element of the global intent 310 in response to the metadata 314 associated with the element matching or not matching a property of the respective region for the respective local intent declaration. For example, the local intent generator 156 may omit the user data rate goal 418 for the intent declaration 330*a* for the region 140*a*.

In some implementations, at sub-block 634, the block 630 may optionally include adding an element to the global intent 310 in response to the metadata 314 associated with the element identifying additional information for the respective region for the respective local intent declaration. For example, the local intent generator 156 may add the constraint 456 to the intent declaration 330*b* for the region 140*b*.

In some implementations, at sub-block 636, the block 630 may optionally include modifying an element of the global intent 310 in response to the metadata 314 associated with the element identifying a rule 320 for the respective region for the respective local intent declaration 330. For example, the local intent generator 156 may modify the throughput goal 414 to the enhanced throughput goal 452 in the intent declaration 330*b* for the region 140*b*.

In some implementations, the global intent may be for a network slice of a RAN that specifies a region for at least two types of network functions. The metadata 314 may identify attributes of each of the at least two types of network functions. At sub-block 638, the block 630 may optionally include selecting attributes for each of the local intent declarations 330 based on a type of network function specified for the respective region 140 matching the attributes of each of at least two types of network functions. For example, the metadata 314 may identify elements associated with a UPF and an AMF, and the global intent may indicate that only one AMF is needed. If one of the regions does not include an AMF, the local intent generator 156 may select only the attributes that are associated with the UPF for that region.

In some implementations, at sub-block 640, the block 630 may optionally include combining a plurality of global intents 310 including the global intent into a combined global intent. At sub-block 642, the block 630 may optionally include generating the plurality of local intent declarations based on the combined global intent (e.g., in response to sub-block 640).

At block 650, the method 600 includes sending the plurality of local intent declarations to each of a plurality of local reconciliation engines configured to reconcile a local configuration of the network functions hosted in the respective region with the respective local intent declaration. In an example, the local intent generator 156, e.g., in conjunction with processor 502, memory 504, and operating system 506, can send the plurality of local intent declarations 330 to each of a plurality of local reconciliation engines 142 configured to reconcile a local configuration of the network functions hosted in the respective region 140 with the respective local intent declaration 330.

At block 660, the method 600 may optionally include executing a workload at an intent target associated with the respective region to generate the local configuration. In an example, an intent target 240 may execute the workload to generate the local configuration for the respective region. For example, the intent target 240 may be an infrastructure management service such as a cloud infrastructure management service (CISM) that allocates computing resources 122, 132 and instantiates services for each of the network functions on the allocated computing resources. The intent target 240 may provide the local configuration to the local reconciliation engine 142.

At block 670, the method 600 includes reconciling a plurality of the local configurations with the global intent. In an example, the reconciliation component 158, e.g., in conjunction with processor 502, memory 504, and operating system 506, can reconcile the plurality of the local configurations with the global intent 310.

Figure 7:
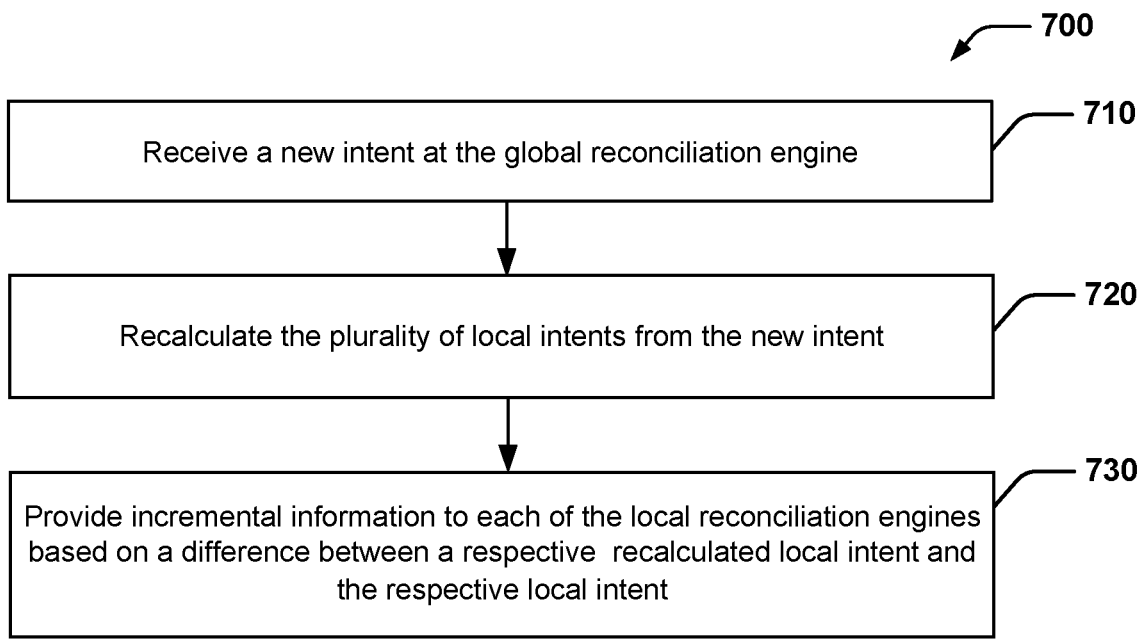
FIG. 7 is a flow diagram of an example of a method of updating local intent declarations, in accordance with aspects described herein.

FIG. 7 is a flow diagram of an additional optional method 700 for updating the local intent declarations based on a new intent. For example, the method 700 can be performed after the method 600 by the device 500 and/or one or more components thereof.

At block 710, the method 700 may include receiving a new intent at the global reconciliation engine 152. At block 720, the method 700 may include recalculating the plurality of local intent declarations 330 from the new intent. At block 730, the method 700 may include providing incremental information to each of the local reconciliation engines 142 based on a difference between a respective recalculated local intent declaration and the respective local intent declaration 330. For example, the incremental information may include only new elements and elements with different values.

Figure 8:
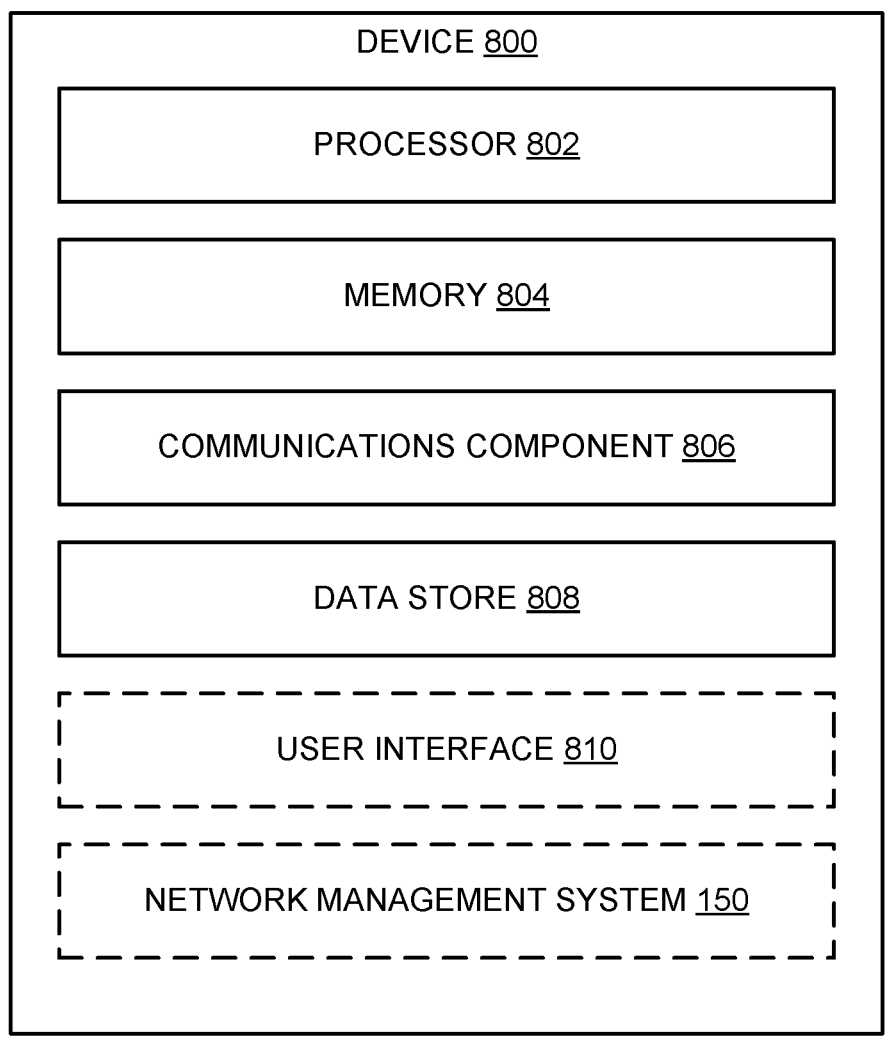
FIG. 8 is a schematic diagram of an example of a device for performing functions described herein, in accordance with aspects described herein.

FIG. 8 illustrates an example of a device 800 including additional optional component details as those shown in FIG. 5. In one aspect, device 800 may include processor 802, which may be similar to processor 502 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 504 such as for storing local versions of operating systems (or components thereof) and/or applications being executed by processor 802, such as the network management system 150, the global reconciliation engine 152, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc.) not currently being executed by processor 802. In addition, data store 808 may be a data repository for the network management system 150, the global reconciliation engine 152, etc.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include a network management system 150 for configuring network resources in multiple regions according to a two-tier reconciliation model based on the global intent, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of network configuration for a radio access network (RAN), comprising:
    receiving a global intent including requirements, goals, and constraints for the RAN;
    tagging the global intent with metadata, wherein the global intent is for a network slice of the RAN and includes metadata that specifies one or more of a plurality of regions for at least two types of network functions and identifies attributes of each of the at least two types of network functions, wherein a plurality of datacenters of the RAN are divided into the plurality of regions;
    generating, by a global reconciliation engine, a plurality of local intent declarations from the global intent, each respective local intent declaration being for a respective region of the plurality of regions that hosts network functions on one or more respective datacenters within the respective region;
    selecting, by a global reconciliation engine, attributes for each of the local intent declarations using one or more rules for omitting, adding, or modifying an element of the local intent declaration based on the type of network function specified for the respective region matching the attributes of each of the at least two types of network functions;
    sending each of the plurality of local intent declarations to a respective local reconciliation engine configured to reconcile a local configuration of the network functions hosted in the respective region with the respective local intent declaration;
    reconciling, by the global reconciliation engine, a plurality of the local configurations with the global intent;
    receiving a new global intent at the global reconciliation engine;
    recalculating the plurality of local intent declarations from the new global intent; and
    providing incremental information to each of the local reconciliation engines based on a difference between a respective recalculated local intent declaration and the respective local intent declaration.

2. The method of claim 1, wherein omitting the element of the global intent is in response to the metadata associated with the element of the global intent not matching a property of the respective region for the respective local intent declaration.

3. The method of claim 1, wherein adding the element with respect to the global intent is in response to the metadata identifying additional information for the respective region for the respective local intent declaration.

4. The method of claim 1, wherein modifying the element with respect to the global intent is in response to the metadata associated with the element identifying a rule for the respective region for the respective local intent declaration.

5. The method of claim 1, further comprising executing a workload at an intent target associated with the respective region to generate the local configuration.

6. The method of claim 1, wherein generating the local intent declarations is based on feedback from the local reconciliation engines.

7. The method of claim 1, wherein generating the plurality of local intent declarations from the global intent comprises:
    combining a plurality of global intents including the global intent into a combined global intent; and
    generating the plurality of local intent declarations based on the combined global intent.

8. A system for network configuration of a radio access network (RAN), comprising:
    a global reconciliation engine configured to:
        receive a global intent including requirements, goals, and constraints for a network;
        tag the global intent with metadata, wherein the global intent is for a network slice of the RAN and includes metadata that specifies one or more of a plurality of regions for at least two types of network functions and identifies attributes of each of the at least two types of network functions, wherein a plurality of datacenters of the RAN are divided into the plurality of regions;
        generate a plurality of local intent declarations from the global intent, each respective local intent declaration being for a respective region of the plurality of regions that hosts network functions on one or more respective datacenters within the respective region;
        select attributes for each of the local intent declarations using one or more rules for omitting, adding, or modifying an element of the local intent declaration based on the type of network function specified for the respective region matching the attributes of each of the at least two types of network functions;
        reconcile a plurality of local configurations with the global intent; and
    a plurality of local reconciliation engines configured to reconcile a respective local configuration of the network functions hosted in the respective region with the respective local intent declaration, wherein the global reconciliation engine is further configured to:

receive a new global intent at the global reconciliation engine;

recalculate the plurality of local intent declarations from the new global intent; and provide incremental information to each of the local reconciliation engines based on a difference between a respective recalculated local intent declaration and the respective local intent declaration.

9. The system of claim 8, further comprising an intent target associated with one or more of the plurality of local reconciliation engines configured to execute a workload associated with the respective region to generate the local configuration.

10. The system of claim 8, wherein generating the local intent declarations is based on feedback from the local reconciliation engines.

11. The system of claim 8, wherein to generate the plurality of local intent declarations from the global intent, the global reconciliation engine is configured to:

combine a plurality of global intents including the global intent into a combined global intent; and generate the plurality of local intent declarations based on the combined global intent.

12. A non-transitory computer-readable medium storing computer-executable code, comprising code to:

receive a global intent including requirements, goals, and constraints for a radio access network (RAN);

tag the global intent with metadata, wherein the global intent is for a network slice of the network and includes metadata that specifies one or more of a plurality of regions for at least two types of network functions and identifies attributes of each of the at least two types of network functions, wherein a plurality of datacenters of the RAN are divided into the plurality of regions;

generate a plurality of local intent declarations from the global intent, each respective local intent declaration being for a respective region of the plurality of regions that hosts network functions on one or more respective datacenters within the respective region;

select, by a global reconciliation engine, attributes for each of the local intent declarations using one or more rules for omitting, adding, or modifying an element of the local intent declaration based on the type of network function specified for the respective region matching the attributes of each of the at least two types of network functions;

send the plurality of local intent declarations to each of a plurality of local reconciliation engines configured to reconcile a local configuration of the network functions hosted in the respective region with the respective local intent declaration;

reconcile a plurality of the local configurations with the global intent;

receive a new global intent at the global reconciliation engine;

recalculate the plurality of local intent declarations from the new global intent; and provide incremental information to each of the local reconciliation engines based on a difference between a respective recalculated local intent declaration and the respective local intent declaration.

* * * * *